(12) United States Patent
Corll et al.

(10) Patent No.: US 11,402,041 B2
(45) Date of Patent: Aug. 2, 2022

(54) GIMBAL CLEARANCES OPTIMIZATION SYSTEM

(71) Applicant: The Boeing Company, Chicago, IL (US)

(72) Inventors: Joseph C. Corll, Huntsville, AL (US);
Joel Rhode, Huntsville, AL (US);
Craig C. Brower, Huntsville, AL (US)

(73) Assignee: The Boeing Company, Chicago, IL (US)

( * ) Notice: Subject to any disclaimer, the term of this patent is extended or adjusted under 35 U.S.C. 154(b) by 192 days.

(21) Appl. No.: 16/718,325

(22) Filed: Dec. 18, 2019

(65) Prior Publication Data

US 2021/0190246 A1 Jun. 24, 2021

(51) Int. Cl.
*F16L 27/02* (2006.01)
*F16L 27/08* (2006.01)

(52) U.S. Cl.
CPC ......... *F16L 27/026* (2013.01); *F16L 27/0857* (2013.01)

(58) Field of Classification Search
CPC ....... F16L 27/023; F16L 27/026; F16L 27/04; F16L 27/042; F16L 27/053; F16L 27/02; F16L 27/08; F16L 27/111

USPC ......................................... 285/226, 264, 265
See application file for complete search history.

(56) References Cited

U.S. PATENT DOCUMENTS

2018/0038530 A1   2/2018   Yeandel

FOREIGN PATENT DOCUMENTS

| EP | 0058439 A1 | 8/1982 |
|----|-----------|--------|
| EP | 0822366 A1 | 2/1998 |

OTHER PUBLICATIONS

Translation EP0822366 (Year: 1998).*
European Patent Office Extended Search Report, dated Mar. 23, 2021, regarding Application No. EP20201936.0, 10 pages.

* cited by examiner

*Primary Examiner* — Aaron M Dunwoody
(74) *Attorney, Agent, or Firm* — Yee & Associates, P.C.

(57) ABSTRACT

An apparatus and method for the manufacture and maintenance of flexible joint gimbal systems. The apparatus and method reduce metal corrugated bellows gimbal joint fatigue damage due to loose fitting parts by implementing a spherical washer to reduce clearance in the flexible joint of the gimbal within desired tolerances.

24 Claims, 11 Drawing Sheets

GIMBAL CLEARANCES OPTIMIZATION SYSTEM

STATEMENT OF GOVERNMENT INTEREST

This invention was made with United States Government support under Contract No. NNM07AB03C awarded by the National Aeronautics and Space Administration and is subject to the provisions of Section 305 of the National Aeronautics and Space Act of 1958 (72 Stat.435:42 U.S.C. 2457). The United States Government has certain rights in this invention.

BACKGROUND INFORMATION

1. Field

The present disclosure relates generally to manufacture and maintenance of flexible joint gimbal systems, and in particular, to reducing metal corrugated bellows gimbal joint fatigue damage due to loose fitting parts by implementing a spherical washer to reduce clearance in the flexible joint within desired tolerances.

2. Background

Flexible metal bellow gimbal joints are commonly used to connect ducting of fluid transport systems where it is beneficial to allow relative movement between portions of the ducting. However, in high strain, high vibration, or dramatic temperature shift environments, for example rocket engines, excessive manufacturing clearances cause unintended additional strain on the bellows under cyclic shear loading, causing significant fatigue damage and reduced lifecycle.

Existing solutions to address the cause of the damage typically require a significant redesign of the existing units. Industry standard practice for gimbals of this nature is to use plain spherical ball bearings. In order to implement this approach in an existing joint that did not utilize bearings from the start, the gimbal joint would need to be separated destructively, machined if sufficient thickness existed or have major components replaced, and then reassembled, which involves welding and recleaning. The significant costs and risks associated with this procedure often makes a full replacement of the unit more feasible.

Therefore, it would be desirable to have a method and apparatus that take into account at least some of the issues discussed above, as well as other possible issues. For example, it would be desirable to have a method and apparatus that provides for removing these clearances without removal of the joint from the assembly and without breaking the pressure barrier and provides full performance capabilities of the joint, but with greatly increased fatigue operational life. It would also be desirable to manufacture a gimbal system that includes reduced clearance in the flexible joint within desired tolerances which can handle the high strain environment from initial installation and provide increased operational life.

SUMMARY

An example of the present disclosure provides a gimbal system comprising a ring. A first clevis is connected to ring and a second clevis is connected to the ring. A washer located between the first clevis and the ring.

Another example of the present disclosure provides an apparatus comprising a washer having a centrally located hole. The washer includes a cylindrical side, wherein the cylindrical side is shaped to contact a side of a ring for a gimbal when the washer is located between a clevis for a gimbal and the ring for the gimbal. The washer further includes a spherical side, wherein the spherical side has a shape that enables the clevis to rotate with respect to the ring about an axis extending centrally through the hole in the washer when the washer is located between the clevis and the ring.

Yet another example of the present disclosure provides a method for installing a washer in a gimbal, comprising identifying a distance between a clevis of the gimbal and a ring of the gimbal and forming the washer such that the washer has a thickness such that a first gap between the washer and the ring and a second gap between the washer and the clevis are cumulatively within a desired gap tolerance.

The features and functions can be achieved independently in various examples of the present disclosure or may be combined in yet other examples in which further details can be seen with reference to the following description and drawings.

BRIEF DESCRIPTION OF THE DRAWINGS

The novel features believed characteristic of the illustrative examples are set forth in the appended claims. The illustrative examples, however, as well as a preferred mode of use, further objectives and features thereof, will best be understood by reference to the following detailed description of an illustrative example of the present disclosure when read in conjunction with the accompanying drawings, wherein:

DETAILED DESCRIPTION

The illustrative examples recognize and take into account one or more different considerations. For example, the illustrative examples recognize and take into account that it would be desirable to manufacture a flexible joint gimbal system capable of reducing manufacturing clearances in the flexible joint within desired tolerances. Further it would be desirable that the flexible joint gimbal system be capable of withstanding high strain, high vibration, or drastic temperature change environments commonly associated with, for example, cryogenic ducting or hydraulic lines of aircraft, rockets, or satellites.

The illustrative examples recognize and take into account that it would be desirable to rework existing flexible joint gimbal systems to reduce fatigue damage due to excessive movement by reducing clearances in the flexible joint without deconstructing the flexible joint by using nondestructive evaluation.

Thus, the illustrative examples provide a flexible joint gimbal system having reduced gap clearances capable of withstanding high vibration and drastic temperature changes common within rocket engines.

Although the illustrative examples for an illustrative example are described with respect to rocket engines or satellites, the illustrative example may be applied to other types of platforms. The platform may be, for example, a mobile platform, a stationary platform, a land-based structure, an aquatic-based structure, and a space-based structure.

Figure 1:
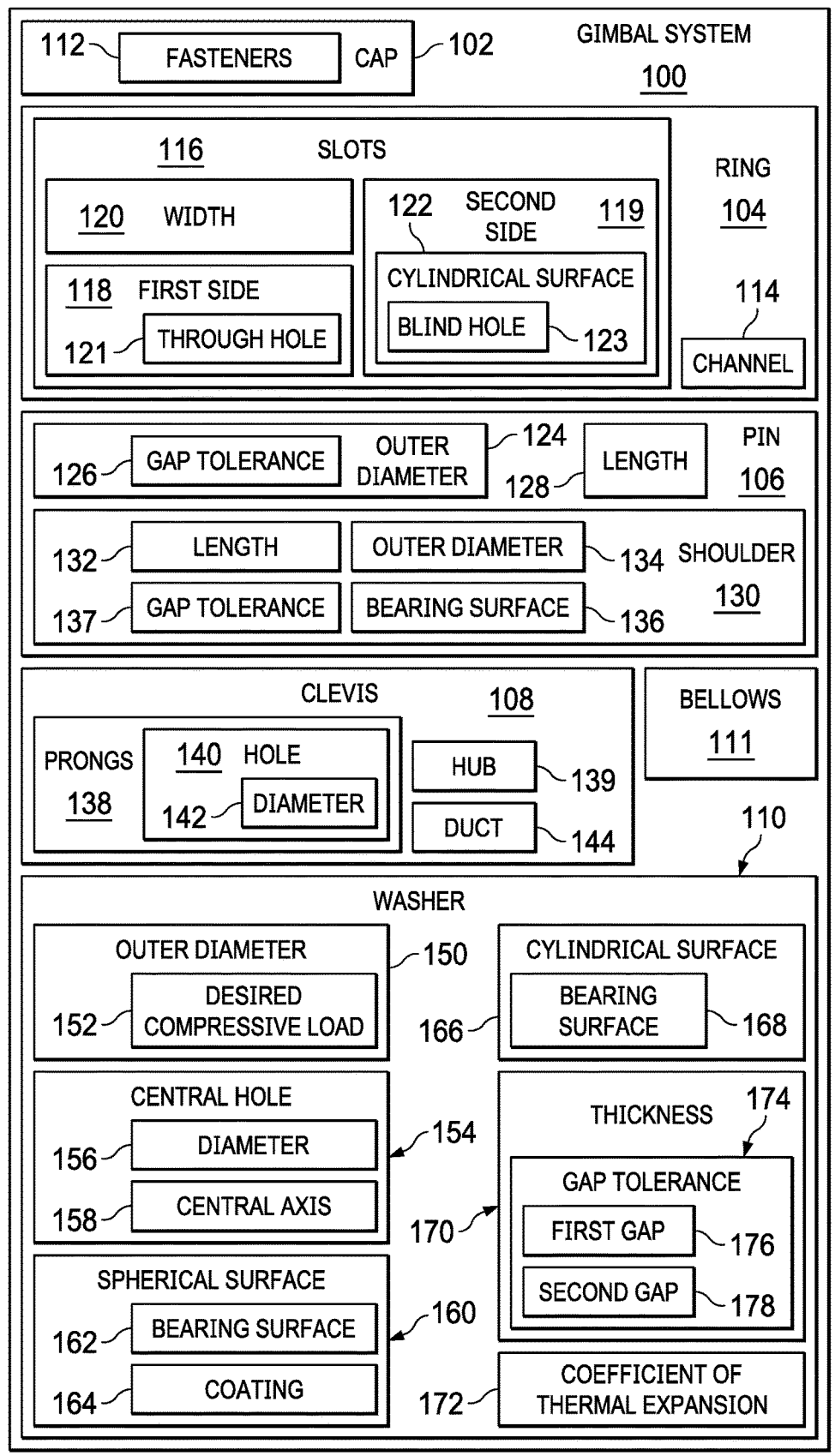
FIG. 1 is an illustration of a gimbal system in the form of a block diagram in accordance with an illustrative example.

Turning now to FIG. 1, an illustration of a block diagram of a gimbal system is depicted in accordance with an illustrative example. Gimbal system 100 includes cap 102, ring 104, pin 106, clevis 108, washer 110, and bellows 111. In the illustrative example, clevis 108 is a U-shaped piece that has holes at the end of prongs. Clevis 108 can allow rotation of one about one axis while restricting rotation of other axes.

Gimbal systems may be found in ducting systems where it is beneficial to provide for relative movement between portions of the ducting. The relative movement may allow for thermal displacements as well as movement due to high vibration of rocket engines.

Cap 102 includes fasteners 112. Fasteners 112 may connect cap 102 to ring 104. Fasteners 112 may be in the form of bolts, threads, tabs, etc. or any other type of fastener that secures cap 102 to ring 104. Cap 102 may abut pin 106 or clevis 108.

Ring 104 includes channel 114 concentrically aligned with an outer circumference of ring 104. As depicted, ring 104 and channel 114 are generally circular in shape, however, any shape that defines a channel capable of surrounding bellows 111 will suffice. Ring 104 further includes slots 116 spaced equidistantly around the circumference of ring 104. Slots 116 are depicted as oval in shape, however, other shapes such as circular, square, etc. are contemplated. Ring 104 must include at least two slots 116 and typically include at least four slots 116. Each slot 116 passing through ring 104 may have first side 118 and second side 119 and width 120. Width 120 corresponds to a width of ring 104. First side 118 includes through hole 121. Through hole 121 passes completely through first side 118 of slot 116. Second side 119 has cylindrical surface 122. The longitudinal axis of cylindrical surface 122 bisects width 120. Cylindrical surface 122 of second side 119 includes blind hole 123. Blind hole 123 may or may not completely pass through second side 119 of slot 116. Through hole 121 and blind hole 123 are concentrically aligned and thus share a common central longitudinal axis.

Pin 106 is depicted as generally cylindrical in shape having outer diameter 124. Pin 106 provides a rotational axis for clevis 108 with respect to ring 104. Pin 106 has length 128 corresponding to the longitudinal center axis of the cylindrical shape. Pin 106 extends through through hole 121, clevis 108, washer 110, and into blind hole 123. Outer diameter 124 fits within through hole 121, clevis 108, washer 110, and into blind hole 123 within gap tolerance 126. During manufacture or rework of gimbal system 100, outer diameter 124 is formed such that the spacing between pin 106 and clevis 108, washer 110, and blind hole 123 is within a desired gap tolerance 126. Pin 106 may include shoulder 130. Shoulder includes length 132, where length 132 is less than length 128. Shoulder 130 may have outer diameter 134, where outer diameter 134 is greater than outer diameter 124. Shoulder 130 may include bearing surface 136. Bearing surface 136 may contact clevis 108. During manufacture or rework of gimbal system 100, outer diameter 134 is formed such that the spacing between shoulder 130 and through hole 121 is within a desired gap tolerance 126. During manufacture or rework of gimbal system 100, length 132 is formed such that the cumulative spacing between cap 102 and pin 106 plus the spacing between bearing surface 136 and clevis 108 is within gap tolerance 137, where gap tolerance 137 is within 0.002 inches.

Clevis 108 includes at least two prongs 138 extending from hub 139. Hub 139 further forms duct 144. Duct 144 provides support for ducting leading to bellows 111 within gimbal system 100. Gimbal system 100 may include one or more clevis 108. Each prong 138 of clevis 108 is identical and thus only one prong 138 will be described further. Prong 138 includes hole 140. Hole 140 has diameter 142. Diameter 142 is sized to receive pin 106. A first surface of prong 138 may contact cap 102 or shoulder 130 of pin 106. A second surface, opposite the first surface contacts washer 110. The surface which contacts washer 110 has a concave cylindrical shape.

Washer 110 is generally disk shaped having outer diameter 150 and including central hole 154 about central axis 158. Washer 110 includes spherical surface 160 opposite cylindrical surface 166. Spherical surface 160 includes bearing surface 162. Bearing surface 162 may contact clevis 108. Bearing surface 162 may include coating 164. Coating 164 may be at least one of a lubricant, a dry film lubricant, a first layer of lubricating pigments in a ceramic binder on the washer and a second layer of graphite and phenolic resin cured on the first layer. Additionally, coating 164 may be applied to the outer surfaces of pin 106 and to cap 102. Spherical surface 160 has a shape that enables clevis 108 to rotate with respect to ring 104 about central axis 158 extending centrally through central hole 154 in the washer when the washer is located between clevis 108 and ring 104.

Cylindrical surface 166 includes bearing surface 168. Bearing surface 168 may contact cylindrical surface 122 of ring 104. Cylindrical surface 166 is shaped to contact cylindrical surface 122 of ring 104 when washer 110 is located between clevis 108 and ring 104.

As used herein, the phrase "at least one of", when used with a list of items, means different combinations of one or more of the listed items may be used, and only one of each item in the list may be needed. In other words, "at least one of" means any combination of items or number of items may be used from the list, but not all of the items in the list are required. The item may be a particular object, a thing, or a category.

For example, without limitation, "at least one of item A, item B, or item C" may include item A, item A and item B, or item B. This example also may include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

Washer has thickness 170. Thickness 170 is formed such that first gap 176 between the washer and the ring and second gap 178 between the washer and the clevis are cumulatively within a desired gap tolerance 174, where gap tolerance 174 is within 0.001 inches. It is possible that either first gap or second gap or both could have a zero value.

Washer 110 is comprised of a material having a coefficient of thermal expansion 172 that is within a selected range of a coefficient of thermal expansion for ring 104 and a coefficient of thermal expansion for clevis 108 that enable maintaining a desired spacing tolerance between the washer and the ring and between the washer and the clevis.

Outer diameter 150 may be sized based on width 120 of ring 104. Outer diameter 150 may be determined such that the washer may carry desired compressive load 152 on bearing surface 168 between cylindrical side 166 of the washer and cylindrical surface 122 of the ring.

The illustration of gimbal system 100 and the different components in FIG. 1 are not meant to imply physical or architectural limitations to the manner in which an illustrative example may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative example.

Figure 2:
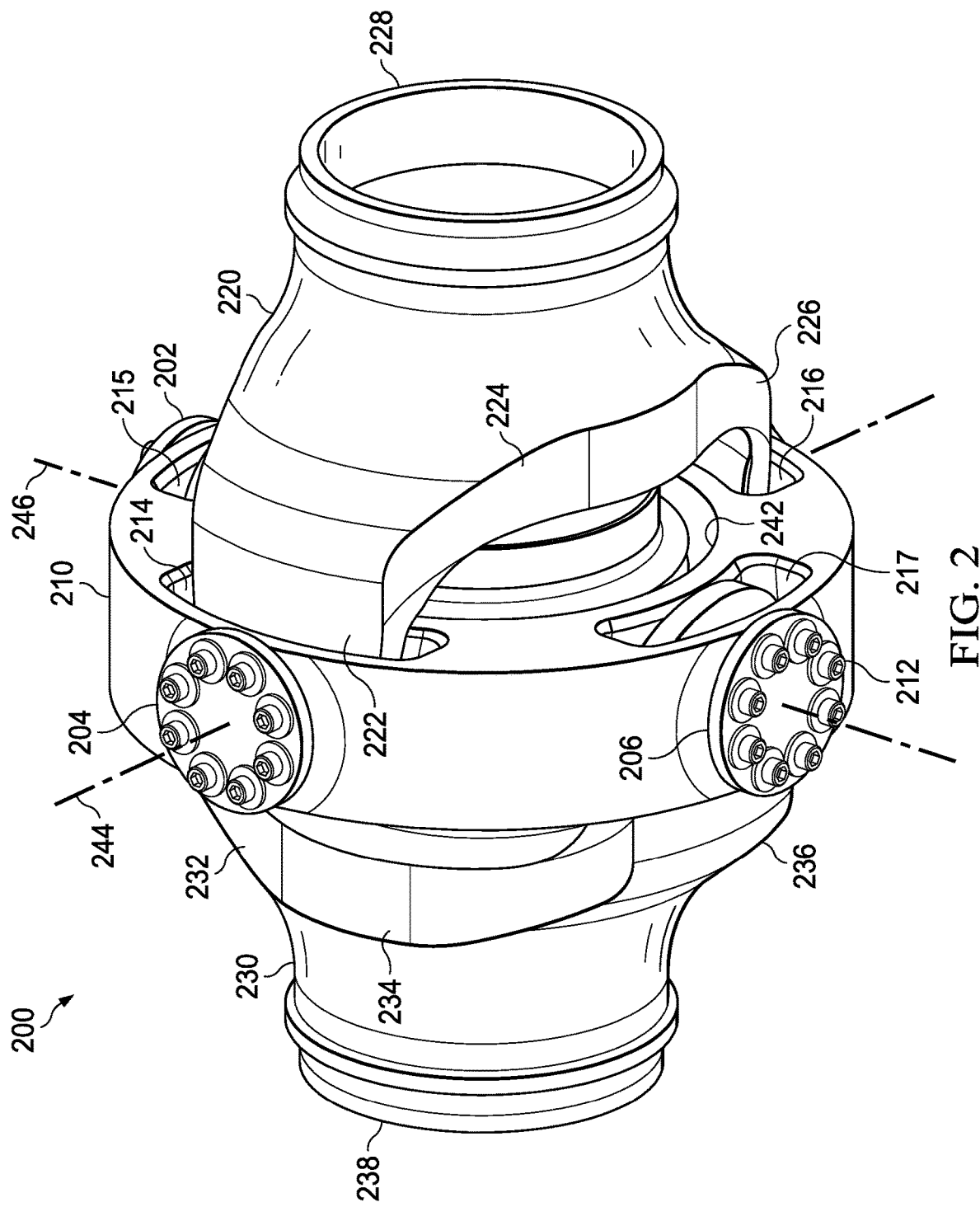
FIG. 2 is an illustration of a gimbal system in accordance with an illustrative example.
Figure 3:
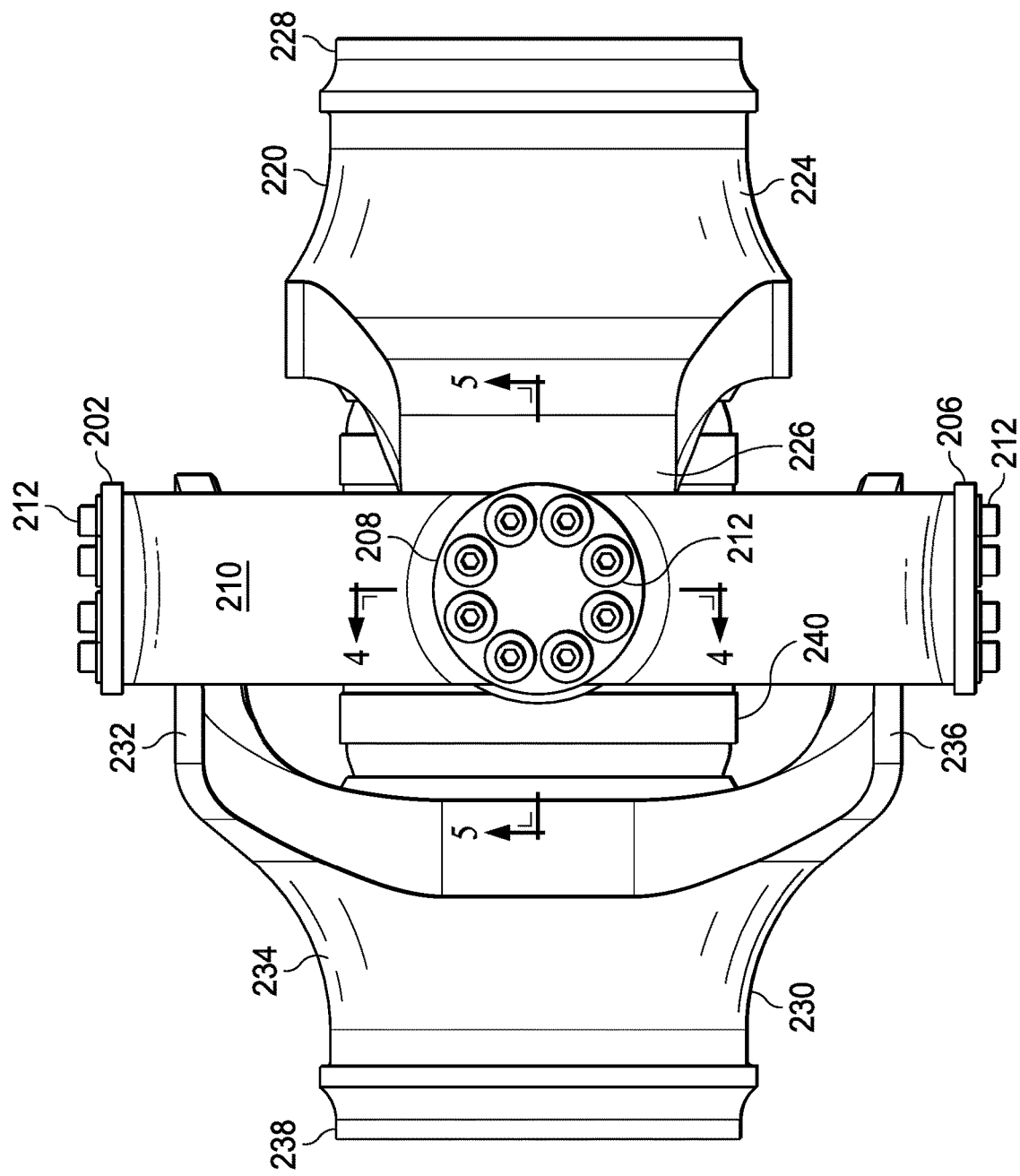
FIG. 3 is an illustration of a gimbal system in accordance with an illustrative example.

With reference now to FIGS. 2-3, illustration of gimbal system 200 is depicted in accordance with an illustrative example. As depicted, gimbal system 200 is an example of one implementation for gimbal system 100 in FIG. 1.

As depicted, gimbal system 200 includes a plurality of caps including cap 202, cap 204, cap 206, and cap 208. The caps are connected to ring 210 with fasteners 212. Ring 210 includes channel 242 and slots 214, 215, 216, and 217, one each associated with a corresponding cap. Clevis 220 has prong 222 extending from hub 224 through slot 214 in ring 210. Clevis 220 has prong 226 extending from hub 224 through slot 216 in ring 210. Clevis 220 includes duct 228. Duct 228 provides support for ducting leading to bellows 111 within gimbal system 100.

Clevis 230 has prong 232 extending from hub 234 through slot 215 in ring 210. Clevis 230 has prong 236 extending from hub 234 through slot 217 in ring 210. Clevis 230 includes duct 238. Duct 238 provides support for ducting leading to bellows 111 within gimbal system 100.

In operation, clevis 220 can pivot within slots 214, 216 with respect to ring 210 about axis 244. Further, clevis 230 can pivot within slots 215, 217 with respect to ring 210 about axis 246. Gimbal system 200 includes bellows 240 positioned within channel 242 and connected to both the clevises such that ducting connected to ducts 228, 238 are fluidly and flexibly connected internally within gimbal system 200.

The overall dimensions of gimbal system 200 and the corresponding components of gimbal system 200 is determined by the intended use. More specifically, the dimensions of the ducting which requires the use of flexible bellow gimbal joints will determine the relative dimensions of gimbal system 200. As a result, dimensions of the components can range from inches to several feet.

Figure 4:
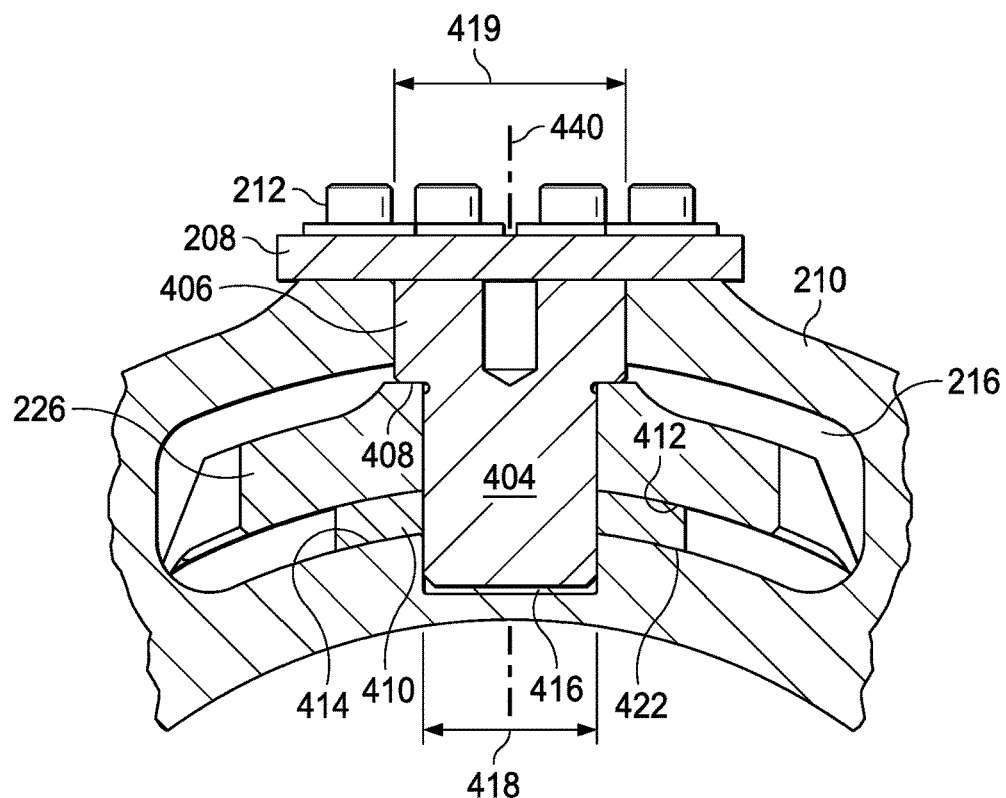
FIG. 4 is an illustration of a section of a gimbal system in accordance with an illustrative example.
Figure 5:
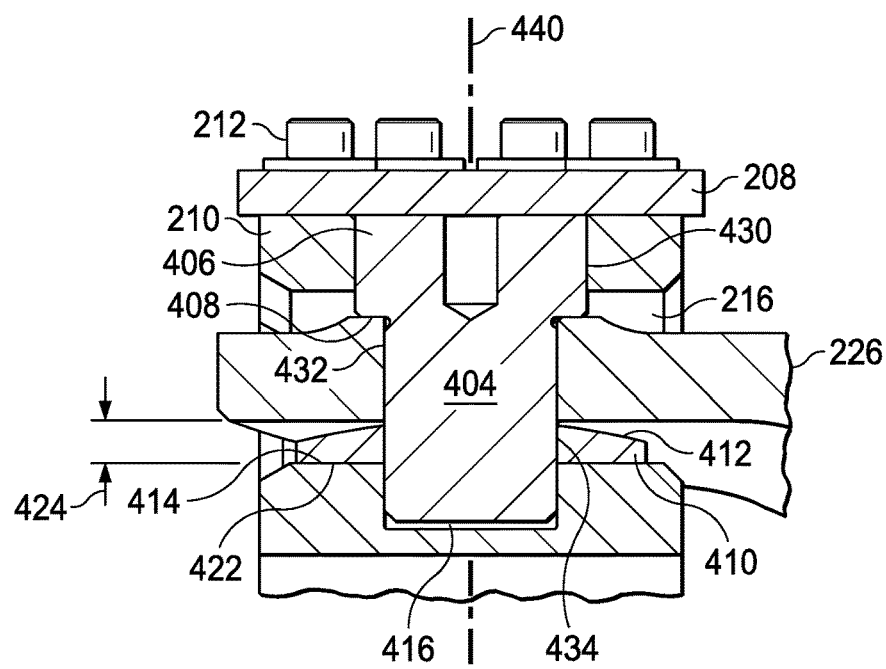
FIG. 5 is an illustration of a section of a gimbal system in accordance with an illustrative example.
Figure 6:
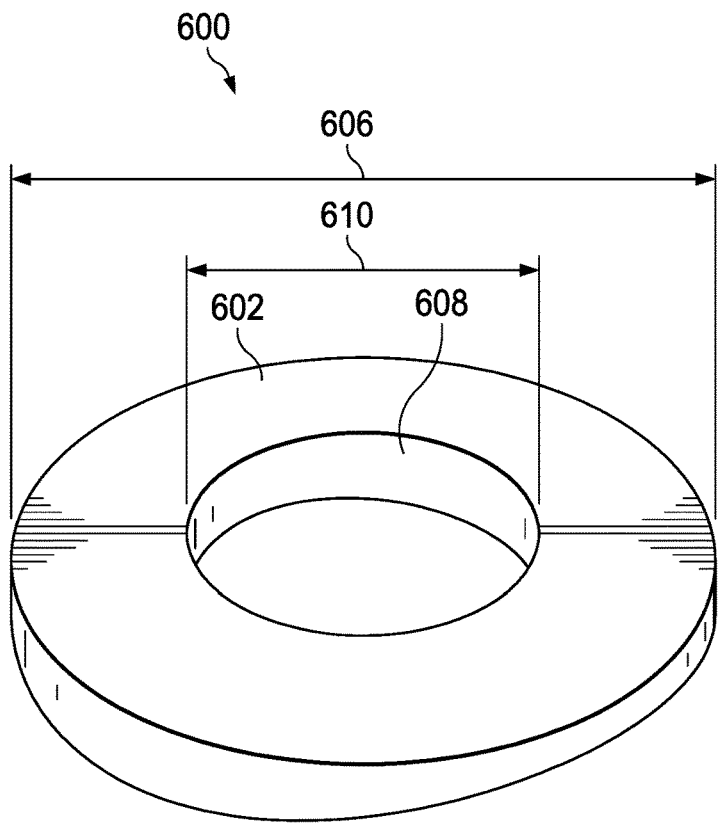
FIG. 6 is an illustration of a washer in accordance with an illustrative example.
Figure 7:
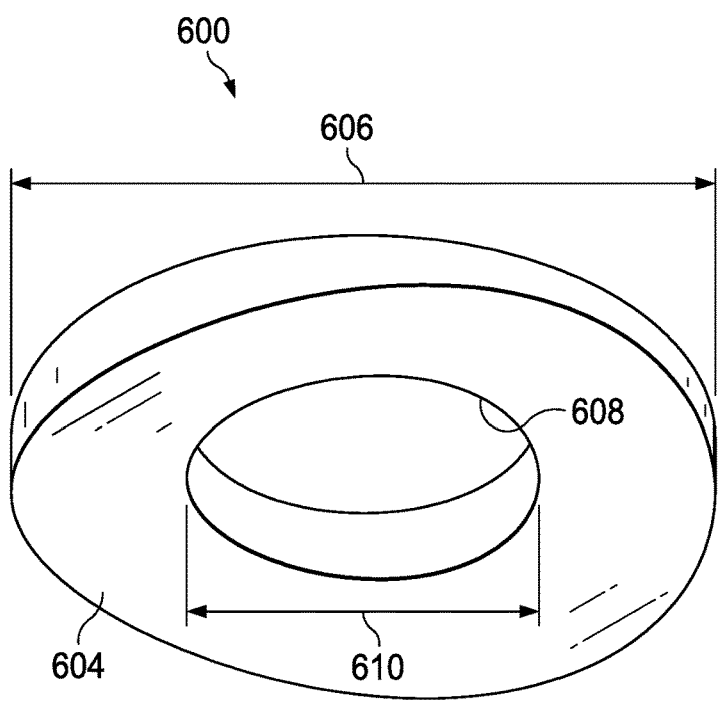
FIG. 7 is an illustration of a washer in accordance with an illustrative example.
Figure 8:
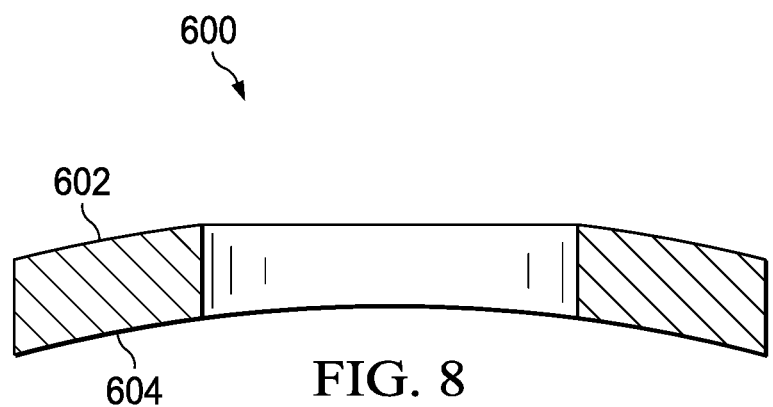
FIG. 8 is an illustration a section of a washer in accordance with an illustrative example.
Figure 9:
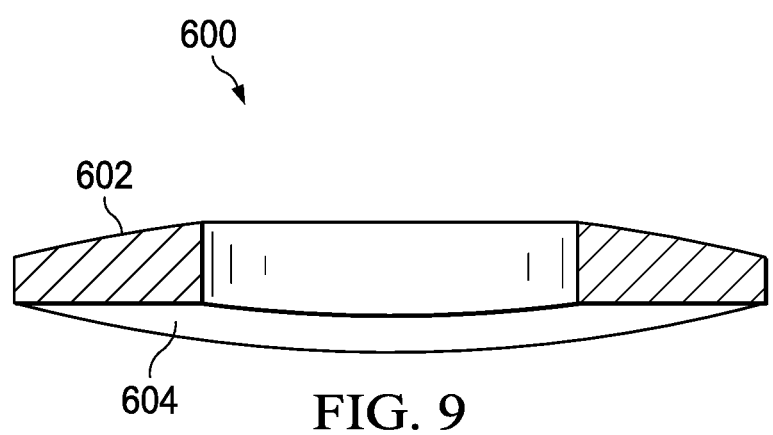
FIG. 9 is an illustration a section of a washer in accordance with an illustrative example.

With reference now to FIGS. 4-5, illustration of a section of a gimbal system in accordance with an illustrative example. FIG. 4 is a sectional view along line 4-4 of FIG. 3 of one prong within one slot of the ring including one pin, one cap, and one washer. FIG. 5, corresponding to a 90° pivot relative to the view of FIG. 4, is a sectional view along line 5-5 of FIG. 3 of one prong within one slot of the ring including one pin, one cap, and one washer. It is understood by one of ordinary skill in the art that FIGS. 4-5 represent one connection of the clevis to the ring and that as depicted, gimbal system 200 includes four identical connections.

As depicted in FIGS. 4-5, prong 226 of clevis 220 extends through slot 216 in ring 210. Pin 404 extends through through hole 430 in ring 210, through hole 432 in prong 226, through central hole 434 in washer 410 and into blind hole 416 in ring 210. Pin 404 has outer diameter 418. Shoulder 406 of pin 404 has outer diameter 419. Cap 208 is connected to ring 210 with fasteners 212. Bearing surface 408 of shoulder 406 contacts prong 226. Prong 226 contacts spherical surface 412 of washer 410. Cylindrical surface 414 of washer 410 contacts cylindrical surface 422 of ring 210. Pin 404 provides axis of rotation 440 for prong 226 with respect to ring 210. Spherical surface 412 is shaped to enable prong 226 of the clevis to rotate with respect to the ring about an axis extending centrally through the central hole 434. In order to facilitate smoother rotation, spherical surface may include a coating such as a lubricant. Washer 410 has thickness 424 such that a gap between washer 410 and ring 210 and a gap between washer 410 and prong 226 are cumulatively within a desired gap tolerance.

With reference now to FIGS. 6-9, illustration of a washer is depicted in accordance with an illustrative example. As depicted, washer 600 is an example of one implementation of washer 110 in FIG. 1 and washer 410 in FIGS. 4-5.

As illustrated, washer 600 includes spherical surface 602 and cylindrical surface 604. Washer has outer diameter 606 and central hole 608. Central hole has diameter 610. Spherical surface 602 is a bearing surface for washer 600 when in contact with a clevis. Cylindrical surface 604 is a bearing surface for washer 600 when in contact with a ring. Central hole 608 is sized to receive pin 106 in FIG. 1 and pin 404 in FIGS. 4-5. During manufacture or rework of an illustrated gimbal system, the pin is formed such that the spacing between the pin and central hole 608 is within a desired gap tolerance.

Figure 10:
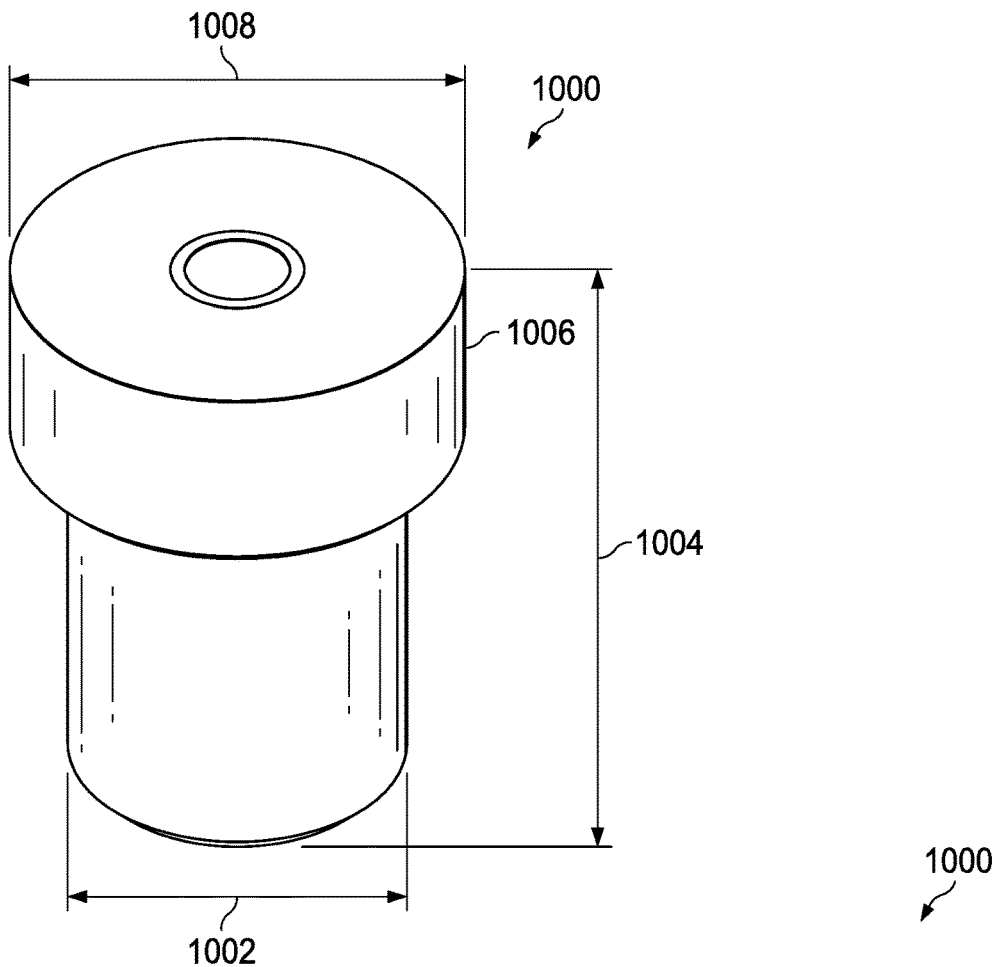
FIG. 10 is an illustration of a pin in accordance with an illustrative example.
Figure 11:
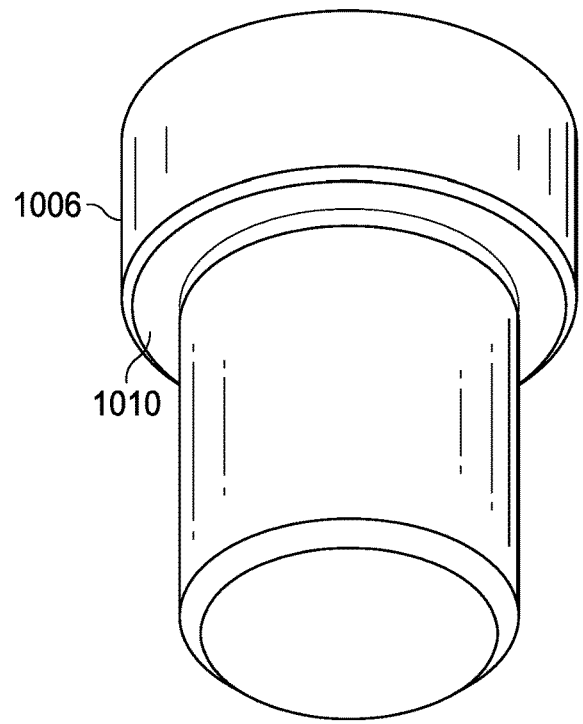
FIG. 11 is an illustration of a pin in accordance with an illustrative example.

With reference now to FIGS. 10-11, illustration of a pin is depicted in accordance with an illustrative example. As depicted, pin 1000 is an example of one implementation of pin 106 in FIG. 1 and pin 404 in FIGS. 4-5.

As illustrated, pin 1000 is depicted as generally cylindrical in shape having outer diameter 1002. Pin 1000 has length 1004. Outer diameter 1002 fits within the ring, the clevis, and washer within a desired gap tolerance. During manufacture or rework of gimbal system 100, outer diameter 1002 is formed such that the spacing between pin 1000 and the clevis, the washer, and the ring is within a desired gap tolerance. Pin 1000 may include shoulder 1006. Shoulder 1006 may have outer diameter 1008, where outer diameter 1008 is greater than outer diameter 1002. Shoulder 1008 may include bearing surface 1010. Bearing surface 1010 may contact the clevis. During manufacture or rework of gimbal system 100, outer diameter 1008 is formed such that the spacing between shoulder 1000 and a through hole in the ring is within a desired gap tolerance. During manufacture or rework of gimbal system 100, length 1004 is formed such that the cumulative spacing between the cap and pin 1000 plus the spacing between bearing surface 1010 and the clevis is within a gap tolerance, where the gap tolerance is within 0.002 inches.

The illustrations of the components of gimbal system 100 in FIGS. 2-11 are provided for the purpose of showing different physical implementations for gimbal system 100 shown in block form in FIG. 1. These illustrations are not meant to limit the manner in which other illustrative examples may be implemented.

Figure 12:
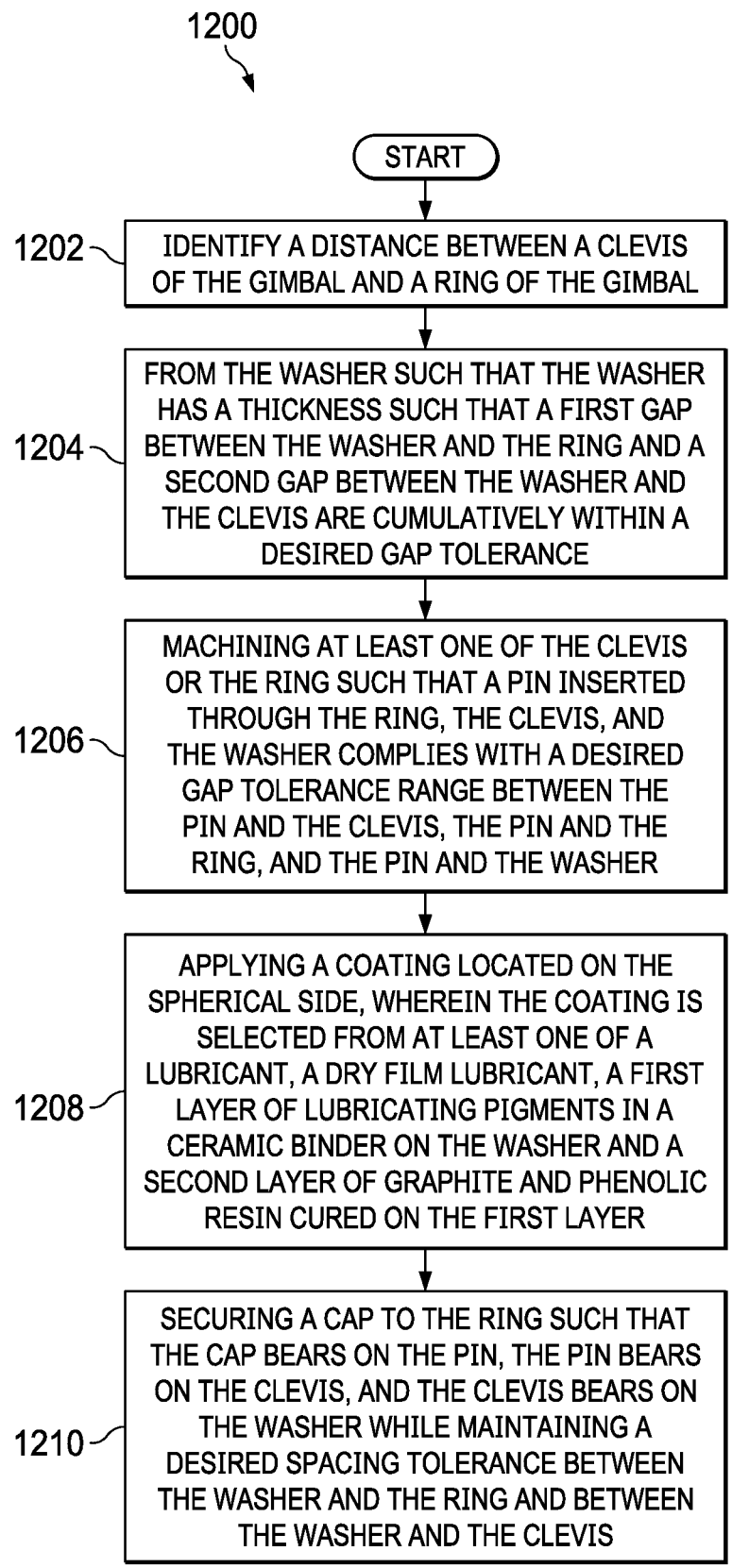
FIG. 12 is a flowchart of a method of installing a washer in a gimbal.

Turning next to FIG. 12, an illustration of a flowchart of a process 1200 for installing a washer in a gimbal system in accordance with an illustrative example. The process illustrated may be implemented with gimbal system 100 in FIG. 1.

Process 1200 begins by identifying a distance between a clevis of a gimbal and a ring of the gimbal (operation 1202). Too much distance between the clevis and ring of a gimbal allows for too much relative movement between the two components in directions movement is not intended for. This excess movement in unintended directions creates fatigue on the components and leads to shorten lifecycles for the components and the gimbal system as a whole.

At operation 1204, the washer is formed such that the washer has a thickness such that a first gap between the washer and the ring and a second gap between the washer and the clevis are cumulatively within a desired gap tolerance. Forming the washer can include machining a blank to a desired shape, pouring a material into a mold and finishing, laser cutting a blank, etc. The first gap or the second gap or both could have a value of zero. Forming the washer may include forming a cylindrical side on the washer, wherein the cylindrical side is shaped to contact a side of the ring when the washer is located between the clevis and the ring. Forming the washer may include forming a spherical side on the washer, wherein the spherical side has a shape that enables the clevis to rotate with respect to the ring about an axis extending centrally through the washer when the washer is located between the clevis and the ring.

At operation 1206, at least one of the clevis or the ring is machined such that a pin inserted through the ring, the clevis, and the washer complies with a desired gap tolerance range between the pin and the clevis, the pin and the ring, and the pin and the washer.

At operation 1208 a coating is applied to the spherical side of the washer. Wherein the coating is selected from at least one of a lubricant, a dry film lubricant, a first layer of lubricating pigments in a ceramic binder on the washer and a second layer of graphite and phenolic resin cured on the first layer.

At operation 1210, a cap is secured to the ring such that the cap bears on the pin, the pin bears on the clevis, and the clevis bears on the washer while maintaining a desired spacing tolerance between the washer and the ring and between the washer and the clevis. Process 1200 may be carried out where the installation of the washer is performed on a newly manufactured gimbal or process 1200 may be carried out where the installation of the washer is a rework of an existing gimbal.

The operations described above are not relegated to the order the operations were presented. Some operations can be performed prior to previously described operations and some can be performed simultaneously. The order the operations were presented does not imply an order for the operations to be performed in.

Figure 13:
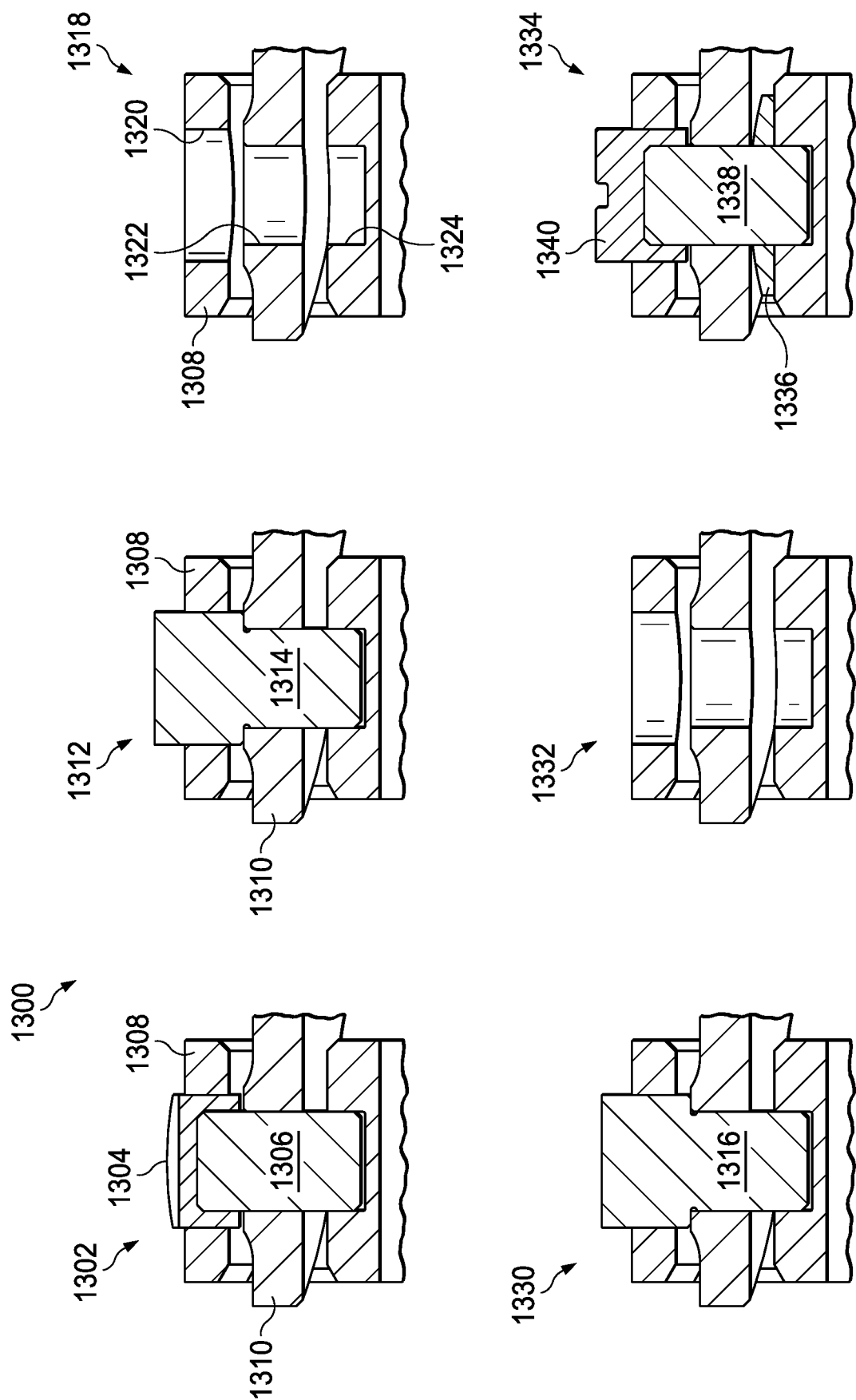
FIG. 13 illustrates a method of installing a washer in a gimbal.

FIG. 13 illustrates method 1300 of installing a washer in a gimbal system in accordance with an illustrative example. At 1302, remove the existing cap 1304 and pin 1306 from ring 1308 and clevis 1310. At 1312, insert tool alignment pin 1314 into and clamp to ring 1308 and clevis 1310. At 1318, machine through hole 1320 in ring 1308, hole 1322 in clevis, and blind hole 1324 in ring to desired dimensions to reduce clearances. At 1330, insert tool holding pin 1316 and repeat 1302, 1312, and 1318 at each position around ring 1308. At 1332 complete all machining of through holes 1320, holes 1322, and blind holes 1324 to desired tolerances. At 1334, install washer 1336, replacement pin 1338, and replacement cap 1340 at each position around ring 1308. At any time during the method, in order to protect the integrity of the bellows of the gimbal system, only one cap and pin combination is disassembled from the gimbal system at a time.

Figure 14:
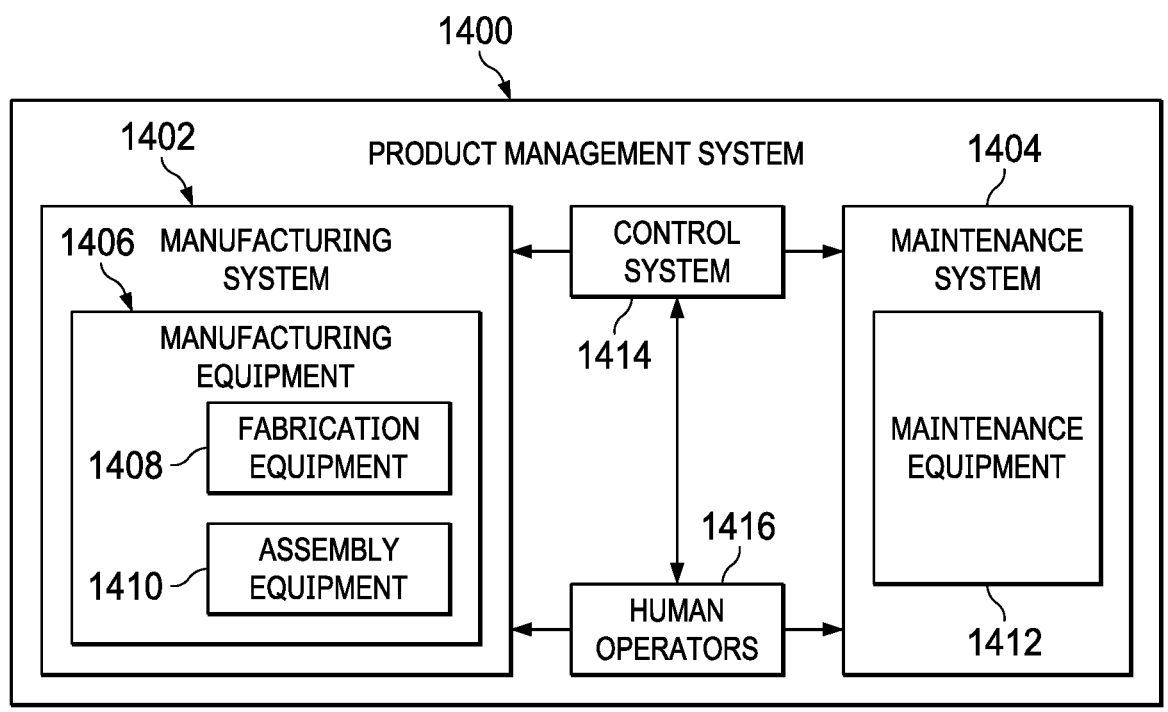
FIG. 14 is an illustration of a product management system in the form of a block diagram in accordance with an illustrative example.

Turning now to FIG. 14, an illustration of a block diagram of a product management system is depicted in accordance with an illustrative example. Product management system 1400 is a physical hardware system. In this illustrative example, product management system 1400 includes at least one of manufacturing system 1402 or maintenance system 1404.

Manufacturing system 1402 is configured to manufacture products, such as gimbal system 100 in FIG. 1. As depicted, manufacturing system 1402 includes manufacturing equipment 1406. Manufacturing equipment 1406 includes at least one of fabrication equipment 1408 or assembly equipment 1410.

Fabrication equipment 1408 is equipment that used to fabricate components for parts used to form gimbal system 100 in FIG. 1. For example, fabrication equipment 1408 can include machines and tools. These machines and tools can be at least one of a drill, a hydraulic press, a furnace, a mold, a composite tape laying machine, a vacuum system, a lathe, or other suitable types of equipment. Fabrication equipment 1408 can be used to fabricate at least one of metal parts, composite parts, semiconductors, circuits, fasteners, ribs, skin panels, spars, antennas, or other suitable types of parts.

Assembly equipment 1410 is equipment used to assemble parts to form gimbal system 100 in FIG. 1. In particular, assembly equipment 1410 is used to assemble components and parts to form gimbal system 100 in FIG. 1. Assembly equipment 1410 also can include machines and tools. These machines and tools may be at least one of a robotic arm, a crawler, a faster installation system, a rail-based drilling system, or a robot. Assembly equipment 1410 can be used to assemble parts such as seats, horizontal stabilizers, wings, engines, engine housings, landing gear systems, and other parts for gimbal system 100 in FIG. 1.

In this illustrative example, maintenance system 1404 includes maintenance equipment 1412. Maintenance equipment 1412 can include any equipment needed to perform maintenance on gimbal system 100 in FIG. 1. Maintenance equipment 1412 may include tools for performing different operations on parts on aircraft gimbal system 100 in FIG. 1. These operations can include at least one of disassembling parts, refurbishing parts, inspecting parts, reworking parts, manufacturing replacement parts, or other operations for performing maintenance on aircraft gimbal system 100 in FIG. 1. These operations can be for routine maintenance, inspections, upgrades, refurbishment, or other types of maintenance operations.

In the illustrative example, maintenance equipment 1412 may include ultrasonic inspection devices, x-ray imaging systems, vision systems, drills, crawlers, and other suitable devices. In some cases, maintenance equipment 1412 can include fabrication equipment 1408, assembly equipment 1410, or both to produce and assemble parts that needed for maintenance.

Product management system 1400 also includes control system 1414. Control system 1414 is a hardware system and may also include software or other types of components. Control system 1414 is configured to control the operation of at least one of manufacturing system 1402 or maintenance system 1404. In particular, control system 1414 can control the operation of at least one of fabrication equipment 1408, assembly equipment 1410, or maintenance equipment 1412.

The hardware in control system 1414 can be implemented using hardware that may include computers, circuits, networks, and other types of equipment. The control may take the form of direct control of manufacturing equipment 1406. For example, robots, computer-controlled machines, and other equipment can be controlled by control system 1414. In other illustrative examples, control system 1414 can manage operations performed by human operators 1416 in manufacturing or performing maintenance on gimbal system 100. For example, control system 1414 can assign tasks, provide instructions, display models, or perform other operations to manage operations performed by human operators 1416.

In the different illustrative examples, human operators 1416 can operate or interact with at least one of manufacturing equipment 1406, maintenance equipment 1412, or control system 1414. This interaction can occur to manufacture gimbal system 100 in FIG. 1.

Of course, product management system 1400 may be configured to manage other products other than gimbal system 100 in FIG. 1. Although product management system 1400 has been described with respect to manufacturing in the aerospace industry, product management system 1400 can be configured to manage products for other industries. For example, product management system 1400 can be configured to manufacture products for the automotive industry as well as any other suitable industries.

Figure 15:
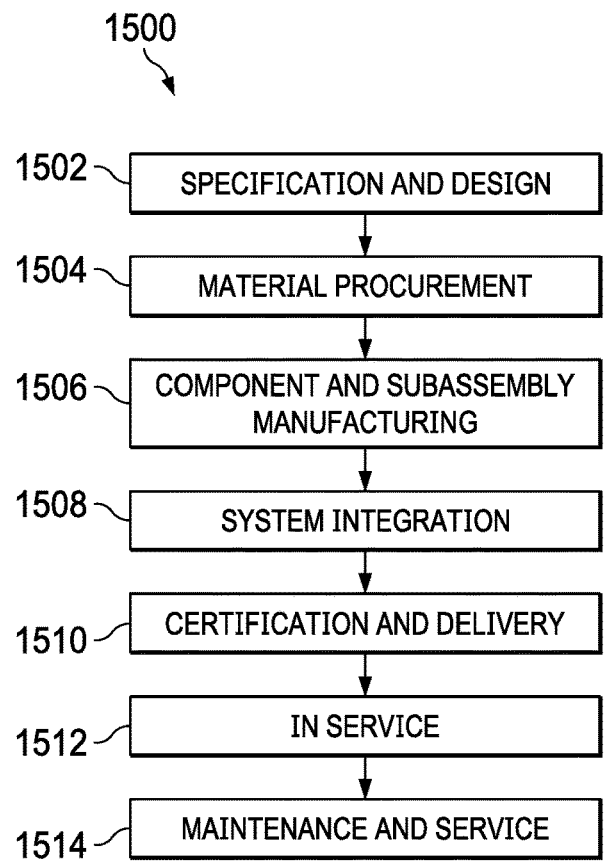
FIG. 15 is an illustration of an aircraft manufacturing and service method in accordance with an illustrative example.
Figure 16:
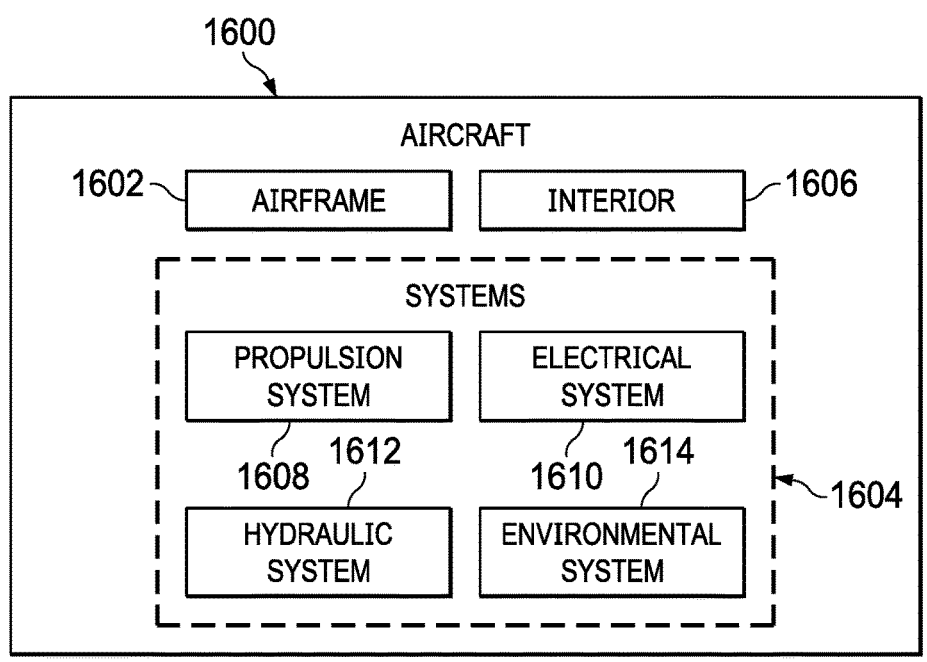
FIG. 16 is an illustration of an aircraft in which an illustrative example may be implemented.

The illustrative examples of the present disclosure may be described in the context of aircraft manufacturing and service method 1500 as shown in FIG. 15 and aircraft 1600 as shown in FIG. 16. Turning first to FIG. 15, an illustration of an aircraft manufacturing and service method is depicted in accordance with an illustrative example. During pre-production, aircraft manufacturing and service method 1500 may include specification and design 1502 of aircraft 1600 in FIG. 16 and material procurement 1504.

During production, component and subassembly manufacturing 1506 and system integration 1508 of aircraft 1600 in FIG. 16 take place. Thereafter, aircraft 1600 may go through certification and delivery 1510 in order to be placed in service 1512. While in service 1512 by a customer, aircraft 1600 is scheduled for routine maintenance and service 1514, which may include modification, reconfiguration, refurbishment, and other maintenance or service.

Each of the processes of aircraft manufacturing and service method 1500 may be performed or carried out by a system integrator, a third party, an operator, or some combination thereof. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 16, an illustration of an aircraft is depicted in which an illustrative example may be implemented. In this example, aircraft 1600 may include airframe 1602 with a plurality of systems 1604 and interior 1606. Examples of systems 1604 include one or more of propulsion system 1608, electrical system 1610, hydraulic system 1612, and environmental system 1614. Any number of other systems may be included. Although an aerospace example is shown, different illustrative examples may be applied to other industries, such as the automotive industry. The apparatuses and methods embodied herein may be employed during at least one of the stages of aircraft manufacturing and service method 1500 in FIG. 15.

In one illustrative example, components or subassemblies produced in component and subassembly manufacturing 1506 in FIG. 15 may be fabricated or manufactured in a manner similar to components or subassemblies produced while aircraft 1600 is in service 1512 in FIG. 15. As yet another example, one or more apparatus examples, method examples, or a combination thereof may be utilized during production stages, such as component and subassembly manufacturing 1506 and system integration 1508 in FIG. 15. One or more apparatus examples, method examples, or a combination thereof may be utilized while aircraft 1600 is in service 1512, during maintenance and service 1514 in FIG. 15, or both. For example, the gimbal system may be used during in maintenance and service 1514 to reduce clearances within gimbal systems in aircraft 1600.

Thus, the illustrative examples provide a flexible joint gimbal system capable of reducing manufacturing clearances in the flexible joint within desired tolerances. Further the illustrative examples provide a gimbal system that reduces clearances within the system without destructive disassembly. Further the illustrative examples provide a flexible joint gimbal system capable of withstanding high strain, high vibration, and drastic temperature change environments commonly associated with, for example, cryogenic ducting or hydraulic lines of aircraft, rockets, or satellites. The illustrative examples provide a process to rework existing flexible joint gimbal systems to reduce fatigue damage due to excessive movement by reducing clearances in the flexible joint without deconstructing the flexible joint by using nondestructive evaluation. The description of the different illustrative examples has been presented for purposes of illustration and description and is not intended to be exhaustive or limited to the examples in the form disclosed. The different illustrative examples describe components that perform actions or operations. In an illustrative example, a component may be configured to perform the action or operation described. For example, the component may have a configuration or design for a structure that provides the component an ability to perform the action or operation that is described in the illustrative examples as being performed by the component.

Many modifications and variations will be apparent to those of ordinary skill in the art. Further, different illustrative examples may provide different features as compared to other desirable examples. The example or examples selected are chosen and described in order to best explain the principles of the examples, the practical application, and to enable others of ordinary skill in the art to understand the disclosure for various examples with various modifications as are suited to the particular use contemplated.

As used herein, a first component "connected to" a second component means that the first component can be connected directly or indirectly to the second component. In other words, additional components may be present between the first component and the second component. The first component is considered to be indirectly connected to the second component when one or more additional components are present between the two components. When the first component is directly connected to the second component, no additional components are present between the two components.

Clause 1: A gimbal system comprising a ring; a first clevis connected to the ring; a second clevis connected to the ring; and a washer located between the first clevis and the ring.

Clause 2: The gimbal system of Clause 1, further comprising a pin extending through the ring, the first clevis, and a centrally located hole in the washer; a cap attached to the ring and in contact with the pin; and a shoulder of the pin provides a bearing surface with the first clevis.

Clause 3: The gimbal system of Clause 1 or 2, wherein the washer further comprises a centrally located hole; a cylindrical side shaped to contact a side of the ring; and a spherical side shaped to enable the clevis to rotate with respect to the ring about an axis extending centrally through the hole.

Clause 4: The gimbal system of any of Clauses 1-3, wherein the washer has an outer diameter based on a width of the ring.

Clause 5: The gimbal system of Clause 3, wherein the centrally located hole in the washer has a diameter based on an outer diameter of a pin extending through the ring, the first clevis, and the centrally located hole in the washer.

Clause 6: The gimbal system of any of Clauses 1-5, wherein the washer has a thickness such that a gap between the washer and the ring and a gap between the washer and the clevis are cumulatively within a desired gap tolerance.

Clause 7: The gimbal system of any of Clauses 1-6, wherein the washer is comprised of a material having a coefficient of thermal expansion that is within a selected range of a coefficient of thermal expansion for the ring and a coefficient of thermal expansion for the clevis that enable maintaining a desired spacing tolerance between the washer and the ring and between the washer and the clevis.

Clause 8: The gimbal system of any of Clauses 1-7 further comprising a plurality of washers having centrally located holes, cylindrical sides shaped to contact corresponding sides of the ring, and spherical sides shaped to enable the first clevis and the second clevis to rotate with respect to the ring about axes extending centrally through the corresponding holes in the washers.

Clause 9: An apparatus comprising a washer having a centrally located hole; a cylindrical side on the washer, wherein the cylindrical side is shaped to contact a side of a ring for a gimbal when the washer is located between a clevis for a gimbal and the ring for the gimbal; and a spherical side on the washer, wherein the spherical side has a shape that enables the clevis to rotate with respect to the ring about an axis extending centrally through the hole in the washer when the washer is located between the clevis and the ring.

Clause 10: The apparatus of Clause 9 further comprising a coating located on the spherical side.

Clause 11: The apparatus of Clause 10, wherein the coating is selected from at least one of a lubricant, a dry film lubricant, a first layer of lubricating pigments in a ceramic binder on the washer and a second layer of graphite and phenolic resin cured on the first layer.

Clause 12: The apparatus of any of Clauses 9-11, wherein the washer has a diameter selected to carry a desired compressive load on a bearing surface between the cylindrical side of the washer and a surface of the ring.

Clause 13: The apparatus of any of Clauses 9-12, wherein the washer has thickness such that a gap between the washer and the ring and a gap between the washer and the clevis both are cumulatively within a desired gap tolerance.

Clause 14: The apparatus of any of Clauses 9-13, wherein the washer is comprised of a material having a coefficient of thermal expansion that is within a selected range of a coefficient of thermal expansion for the ring and a coefficient of thermal expansion for the clevis that enable maintaining a desired spacing tolerance between the washer and the ring and between the washer and the clevis.

Clause 15: The apparatus of any of Clauses 9-14, wherein the clevis in the gimbal connects to ducting for one of a fluid transport system, a liquid transport system, a gas transport system, cryogenic system, a hydraulic system, and a fuel system.

Clause 16: The apparatus of any of Clauses 9-15, wherein the cylindrical side on the washer forms a first bearing surface for the ring and the spherical side forms a second bearing surface for the clevis.

Clause 17: A method for installing a washer in a gimbal, comprising identifying a distance between a clevis of the gimbal and a ring of the gimbal; and forming the washer such that the washer has a thickness such that a first gap between the washer and the ring and a second gap between the washer and the clevis are cumulatively within a desired gap tolerance.

Clause 18: The method of Clause 17, wherein forming the washer comprises forming a cylindrical side on the washer, wherein the cylindrical side is shaped to contact a side of the ring when the washer is located between the clevis and the ring.

Clause 19: The method of Clause 17 or 18, wherein forming the washer comprises forming a spherical side on the washer, wherein the spherical side has a shape that enables the clevis to rotate with respect to the ring about an axis extending centrally through the washer when the washer is located between the clevis and the ring.

Clause 20: The method of any of Clauses 17-19, further comprising machining at least one of the clevis or the ring such that a pin inserted through the ring, the clevis, and the washer complies with a desired gap tolerance range between the pin and the clevis, the pin and the ring, and the pin and the washer.

Clause 21: The method of Clause 18, further comprising applying a coating located on the spherical side, wherein the coating is selected from at least one of a lubricant, a dry film lubricant, a first layer of lubricating pigments in a ceramic binder on the washer and a second layer of graphite and phenolic resin cured on the first layer.

Clause 22: The method of Clause 19, further comprising securing a cap to the ring such that the cap bears on the pin, the pin bears on the clevis, and the clevis bears on the washer while maintaining a desired spacing tolerance between the washer and the ring and between the washer and the clevis.

Clause 23: The method of any of Clauses 17-22, where the installation of the washer is performed on a new gimbal.

Clause 24: The method of any of Clauses 17-23, where the installation of the washer is a rework of an existing gimbal.

What is claimed is:

1. A gimbal system comprising:
   a ring;
   a first clevis connected to the ring;

a second clevis connected to the ring;
a washer located between the first clevis and the ring;
a pin extending through the ring, the first clevis, and a centrally located hole in the washer;
a cap attached to the ring and in contact with the pin; and
a shoulder of the pin provides a bearing surface with the first clevis.

2. The gimbal system of claim 1, wherein the washer further comprises:
a centrally located hole;
a cylindrical side shaped to contact a side of the ring; and
a spherical side shaped to enable the clevis to rotate with respect to the ring about an axis extending centrally through the hole.

3. The gimbal system of claim 2, wherein the centrally located hole in the washer has a diameter based on an outer diameter of the pin extending through the ring, the first clevis, and the centrally located hole in the washer.

4. The gimbal system of claim 2 further comprising:
a coating located on the spherical side.

5. The gimbal system of claim 1, wherein the washer has an outer diameter based on a width of the ring.

6. The gimbal system of claim 1, wherein the washer has a thickness such that a gap between the washer and the ring and a gap between the washer and the clevis are cumulatively within a desired gap tolerance.

7. The gimbal system of claim 1, wherein the washer is comprised of a material having a coefficient of thermal expansion that is within a selected range of a coefficient of thermal expansion for the ring and a coefficient of thermal expansion for the clevis that enable maintaining a desired spacing tolerance between the washer and the ring and between the washer and the clevis.

8. The gimbal system of claim 1 further comprising:
a plurality of washers having centrally located holes, cylindrical sides shaped to contact corresponding sides of the ring, and spherical sides shaped to enable the first clevis and the second clevis to rotate with respect to the ring about axes extending centrally through the corresponding holes in the washers.

9. An apparatus comprising:
a washer having a centrally located hole;
a cylindrical side on the washer, wherein the cylindrical side is shaped to contact a side of a ring for a gimbal when the washer is located between a clevis for a gimbal and the ring for the gimbal;
a spherical side on the washer, wherein the spherical side has a shape that enables the clevis to rotate with respect to the ring about an axis extending centrally through the hole in the washer when the washer is located between the clevis and the ring;
a pin extending through the ring, the clevis, and the centrally located hole in the washer;
a cap attached to the ring and in contact with the pin; and
a shoulder of the pin provides a bearing surface with the clevis.

10. The apparatus of claim 9 further comprising:
a coating located on the spherical side.

11. The apparatus of claim 10, wherein the coating is selected from at least one of a lubricant, a dry film lubricant, a first layer of lubricating pigments in a ceramic binder on the washer and a second layer of graphite and phenolic resin cured on the first layer.

12. The apparatus of claim 9, wherein the washer has a diameter selected to carry a desired compressive load on a bearing surface between the cylindrical side of the washer and a surface of the ring.

13. The apparatus of claim 9, wherein the washer has thickness such that a gap between the washer and the ring and a gap between the washer and the clevis both are cumulatively within a desired gap tolerance.

14. The apparatus of claim 9, wherein the washer is comprised of a material having a coefficient of thermal expansion that is within a selected range of a coefficient of thermal expansion for the ring and a coefficient of thermal expansion for the clevis that enable maintaining a desired spacing tolerance between the washer and the ring and between the washer and the clevis.

15. The apparatus of claim 9, wherein the clevis in the gimbal connects to ducting for one of a fluid transport system, a liquid transport system, a gas transport system, cryogenic system, a hydraulic system, and a fuel system.

16. The apparatus of claim 9, wherein the cylindrical side on the washer forms a first bearing surface for the ring and the spherical side forms a second bearing surface for the clevis.

17. A method for installing a washer in a gimbal, comprising:
identifying a distance between a clevis of the gimbal and a ring of the gimbal; and
forming the washer such that the washer has a thickness such that a first gap between the washer and the ring and a second gap between the washer and the clevis are cumulatively within a desired gap tolerance; and
securing a cap to the ring such that the cap bears on the pin, the pin bears on the clevis, and the clevis bears on the washer while maintaining a desired spacing tolerance between the washer and the ring and between the washer and the clevis.

18. The method of claim 17, wherein forming the washer comprises:
forming a cylindrical side on the washer, wherein the cylindrical side is shaped to contact a side of the ring when the washer is located between the clevis and the ring.

19. The method of claim 18, further comprising:
applying a coating located on the spherical side, wherein the coating is selected from at least one of a lubricant, a dry film lubricant, a first layer of lubricating pigments in a ceramic binder on the washer and a second layer of graphite and phenolic resin cured on the first layer.

20. The method of claim 17 wherein forming the washer comprises:
forming a spherical side on the washer, wherein the spherical side has a shape that enables the clevis to rotate with respect to the ring about an axis extending centrally through the washer when the washer is located between the clevis and the ring.

21. The method of claim 17, further comprising:
machining at least one of the clevis or the ring such that a pin inserted through the ring, the clevis, and the washer complies with a desired gap tolerance range between the pin and the clevis, the pin and the ring, and the pin and the washer.

22. The method of claim 17, where the installation of the washer is performed on a new gimbal.

23. The method of claim 17, where the installation of the washer is a rework of an existing gimbal.

24. The method of claim 17, wherein the washer has an outer diameter based on a width of the ring of the gimbal.

* * * * *